(12) United States Patent
Ovenshire et al.

(10) Patent No.: US 9,199,575 B2
(45) Date of Patent: Dec. 1, 2015

(54) VEHICLE LAMP ASSEMBLY WITH FLEXIBLE LENS

(71) Applicant: GM GLOBAL TECHNOLOGY OPERATIONS LLC, Detroit, MI (US)

(72) Inventors: Jay H. Ovenshire, Rochester, MI (US); Stanley C. Dutt, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 14/092,314

(22) Filed: Nov. 27, 2013

(65) Prior Publication Data

US 2015/0146444 A1    May 28, 2015

(51) Int. Cl.
*B60Q 1/56* (2006.01)
(52) U.S. Cl.
CPC ...................... *B60Q 1/56* (2013.01)

(58) Field of Classification Search
CPC .......................................... B60Q 1/56
USPC ................................. 362/497, 496
See application file for complete search history.

(56) References Cited

U.S. PATENT DOCUMENTS

| | | | | |
|---|---|---|---|---|
| 5,272,603 A | * | 12/1993 | Camarota et al. | 362/95 |
| 6,092,917 A | * | 7/2000 | Litke et al. | 362/490 |
| 2009/0129112 A1 | * | 5/2009 | Shamitz et al. | 362/549 |
| 2009/0196059 A1 | * | 8/2009 | Koizumi | 362/497 |

* cited by examiner

*Primary Examiner* — Evan Dzierzynski
(74) *Attorney, Agent, or Firm* — Quinn Law Group, PLLC (57) ABSTRACT

A lamp assembly for illuminating an exterior portion of a vehicle includes a lamp housing, and a switch supported by the lamp housing. The lamp assembly includes a flexible lens that is supported by the lamp housing and flexes to move relative to the lamp housing between an undepressed position and a depressed position when a force is applied to the lens. The lens is configured to cause the switch to move from a first position to a second position when the lens moves to the depressed position.

14 Claims, 6 Drawing Sheets

FIG. 13

VEHICLE LAMP ASSEMBLY WITH FLEXIBLE LENS

TECHNICAL FIELD

The present teachings generally include a lamp assembly with a flexible lens for a vehicle. More specifically, the flexible lens is movable to activate a switch.

BACKGROUND

Vehicles typically have a light source positioned to illuminate a license plate on a rear closure panel. The light source is typically a bulb that is part of a lamp assembly, and a lens covers the light source. The bulb is connected with a power source via a wire and an electrical connector. The lamp assembly must be specifically designed to provide adequate illumination, and have appropriate thermal ventilation.

Some vehicles also have a touch pad on the same closure panel as the lamp assembly. The touch pad is movable when pressed to activate a switch that unlatches a latch assembly. When unlatched, the closure panel can be moved to an open state, either manually or via a power source such as a power motor. The packaging area provided adjacent the license plate is relatively small, and packaging both a light source and a touch pad is challenging. In one known application, a touch pad is located adjacent to and is partially surrounded by a lens. The touch pad pivots inward about a torsional axis at one end of the touch pad when depressed, and has arms at either end that bias the touch pad to an undepressed position.

SUMMARY

A lamp assembly for illuminating an exterior portion of a vehicle is provided that has a flexible lens that functions both to cover a bulb while allowing transmission of light from the bulb, and also functions as a touch pad that can be depressed to activate a switch. The switch activates another system, such as to cause unlatching of a latch assembly. By combining the functions of the lens and the touch pad in a single component, the overall size of the lamp assembly and/or the number of components in the lamp assembly is reduced. Additionally, only one opening is necessary in the closure panel to mount the lamp assembly, which simplifies the avoidance of potential air leak paths and reduces dimensional tolerance stack-up.

A lamp assembly includes a lamp housing, and a switch supported by the lamp housing and movable between a first position and a second position. The lamp assembly includes a lens that is supported by the lamp housing and is flexible to allow movement relative to the lamp housing between an undepressed position and a depressed position. The lens is configured to cause the switch to move to the second position when the lens is moved to the depressed position. The switch may be operatively connectable to the latch assembly and operable to unlatch the latch assembly when the switch is in the second position, such as to unlatch a closure panel from a vehicle body.

The lamp assembly may include a biasing element that is configured to bias the lens to the undepressed position. In one embodiment, the biasing element is a spring that is depressed when the lens is depressed. In another embodiment, the biasing element is a pair of flexible arms integral with the lens. The arms flex to allow the lens to move to the depressed position, but bias the lens to the undepressed position.

The above features and advantages and other features and advantages of the present teachings are readily apparent from the following detailed description of the best modes for carrying out the present teachings when taken in connection with the accompanying drawings.

DETAILED DESCRIPTION

Referring to the drawings, wherein like reference numbers refer to like components and as further described herein with respect to FIGS. 1-7, a novel lamp assembly 28 is provided with a transparent flexible lens 32 that enables the lens 32 to serve both to illuminate a vehicle license plate 24, and to serve as a touchpad to activate a switch 33 to unlatch a vehicle closure panel 12 from a vehicle body 14. In FIGS. 8-12, an alternate embodiment of a novel lamp assembly 228 also has an alternate embodiment of a transparent flexible lens 232 that enables the lens 232 to serve both to illuminate the vehicle license plate 24, and to serve as a touchpad to activate a switch 233 to unlatch the vehicle closure panel 12 from the vehicle body 14.

Figure 1:
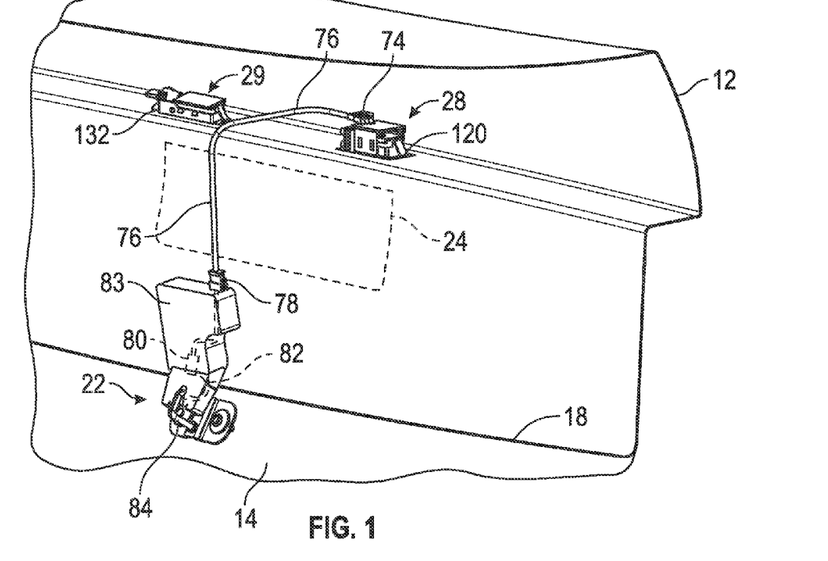
FIG. 1 is a schematic illustration in fragmentary perspective view of a portion of a first embodiment of a vehicle having a deck lid and a lamp assembly in accordance with one aspect of the present teachings.
Figure 2:
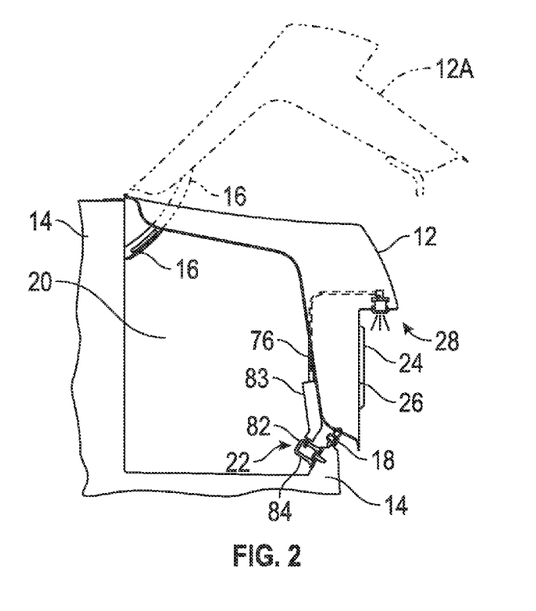
FIG. 2 is a schematic illustration in fragmentary side view showing the deck lid of FIG. 1 in a closed, latched position, and showing the deck lid in an open, unlatched position in phantom.

FIG. 1 shows a portion of a vehicle 10 that includes a closure panel 12. In the embodiment shown, the closure panel 12 is a deck lid, and may be referred to herein as such. The deck lid 12 is secured to a vehicle body 14, and is selectively movable with respect to the vehicle body 14 between a closed position shown in FIGS. 1 and 2, and an open position 12A shown in phantom in FIG. 2. In FIG. 2, a side portion of the vehicle body 14, such as a rear quarter panel, is removed to reveal the internal compartment 20. The deck lid 12 may be secured to the vehicle body 14 by hinge arms 16 or the like. One hinge arm 16 is schematically represented in FIG. 2 both in a closed position and when the deck lid 12 is in an open position 12A. Those skilled in the art will understand a variety of ways to connect the deck lid 12 to the vehicle body 14.

The vehicle body 14 defines an access opening 18 that permits access to an internal compartment 20. A portion of the access opening 18 is indicated by the edge of the body 14 to which the deck lid 12 closes. The internal compartment 20 is defined by the vehicle body 14 and the deck lid 12. When the deck lid 12 is in the open position, access to the internal compartment 20 is permitted through the access opening 18.

A latch assembly 22 is configured to be operable to selectively latch the deck lid 12 to the vehicle body 14 when the deck lid 12 is in the closed position. The latch assembly 22 is selectively unlatchable to release the deck lid 12 from the vehicle body 14 and thereby permit movement of the deck lid 12 to the open position 12A. Movement of the deck lid 12 to the open position 12A may be accomplished manually. Alternatively, in some embodiments, a power source such as an electric motor is included on the vehicle 10 to power the deck lid 12 to the open position 12A. For example, an electric motor could be mounted adjacent to the hinge 16 and can have a motor shaft that turns a gear than interfaces with the hinge 16 to move the hinge 16 to the extended position shown in phantom.

A license plate 24 is mounted to an exterior portion 26 of the deck lid 12. The vehicle 10 has a lamp assembly 28 that is mounted to the deck lid 12 and is configured to illuminate the exterior portion 26 of the closure panel 12 and, in particular, the license plate 24 mounted thereon. As indicated in FIG. 1, the vehicle 10 has an additional lamp assembly 29 also secured to the deck lid 12 and positioned to illuminate the license plate 24. The license plate 24 is indicated in hidden lines in FIG. 1 as it is on the opposite side of the deck lid 12 than that shown. The lamp assembly 28 and the lamp assembly 29 are arranged above the license plate 24 when the deck lid 12 is closed, and slightly to opposite side edges of the license plate 24. Other spatial arrangements of the lamp assembly 28, 29 are possible. Additionally, in some embodiments, the lamp assembly 28 may be the only lamp assembly.

The lamp assembly 28 has a dual purpose. First, the lamp assembly 28 illuminates the license plate 24. Second, referring to FIG. 3, the lamp assembly 28 is operable to selectively unlatch the latch assembly 22 by use of a flexible lens 32 that can be depressed to move a switch 33 to activate the latch assembly 22. The lamp assembly 28 includes a lamp housing 30 that is configured to support a lens 32, a switch housing 34, and a socket 36 that receives a bulb 38. The lamp housing 30 may be a molded plastic or other suitable material. The lamp housing 30 has two sidewalls 38A, 38B that are generally parallel with one another and that are connected at either end by end walls 40A, 40B. The lamp housing 30 is generally an open cavity between the sidewalls 38A, 38B when viewed from above and below in FIG. 3. The sidewalls 38A, 38B have openings 42A, 42B aligned with one another along the length of the sidewalls 38A, 38B between the ends 40A, 40B. Additionally, each sidewall 38A, 38B is formed with two protrusions 44 spaced from one another along the length of the sidewall 38A, 38B. The protrusions 44 flare outward from an upper edge 46A, 46B of the respective sidewall 38A, 38B. The sidewalls 38A, 38B transition from a relatively high portion 48A to a relatively low portion 48B at a ramped shoulder 48C. Additionally, the lamp housing 30 has a flexible tab 50 at the end wall 40A, and parallel support arms 52 extending lengthwise from the end wall 40B.

Figure 3:
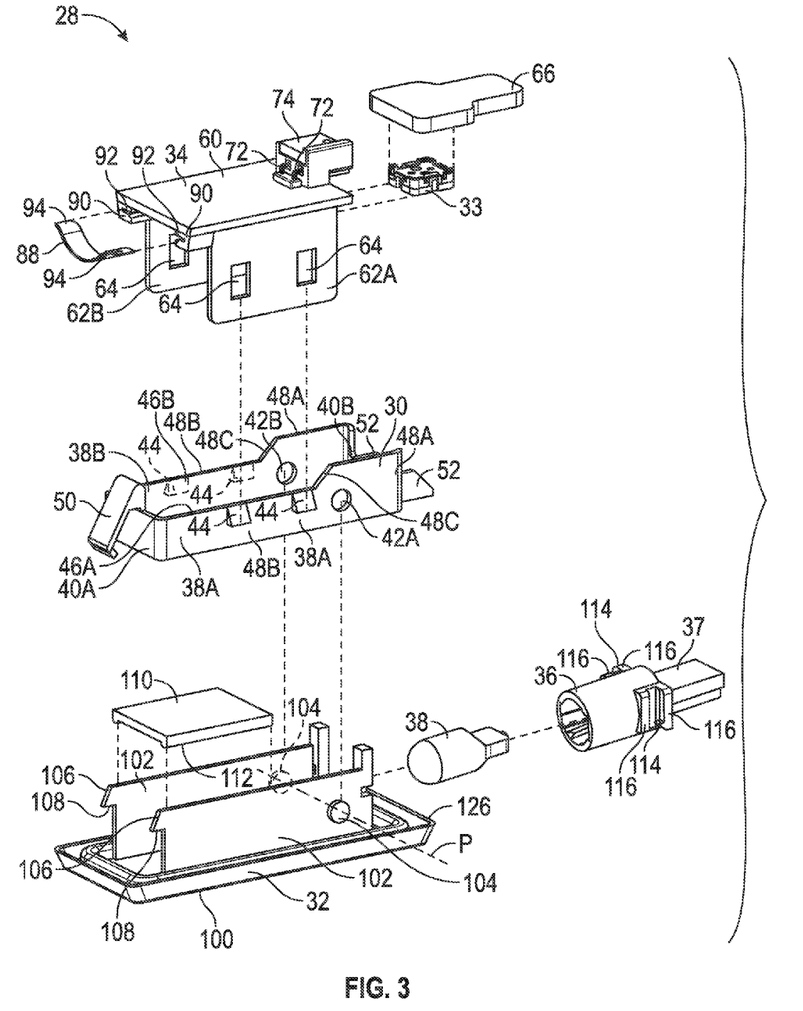
FIG. 3 is a schematic illustration in exploded perspective view of the lamp assembly of FIG. 1.
Figure 4:
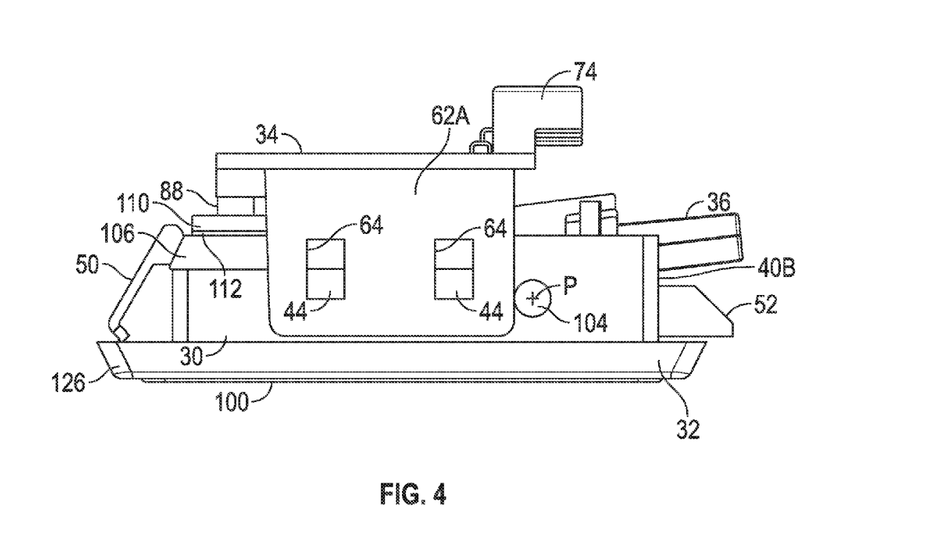
FIG. 4 is a schematic illustration in side view of the lamp assembly of FIG. 1.

The switch housing 34 has a base 60 with two spaced sidewalls 62A, 62B that are generally parallel with one another and that extend downward from the base as viewed in FIG. 3. Each sidewall 62A, 62B has two spaced slots 64 that are equally spaced from one another in each of the sidewalls 62A, 62B. One of the slots 64 of sidewall 62B is not visible in FIG. 3 but is aligned with the right-most slot 64 of the sidewall 62A. A circuit board 66 is configured to fit to an underside of the base 60 and between the two sidewalls 62A, 62B. The circuit board 66 can be secured to the underside of the base 60 with adhesive, screws, or otherwise. The switch 33 is secured to an underside of the circuit board 66 and is configured so that the switch 33 is in an open state in the absence of a force pushing the switch toward the circuit board 66. In other words, referring to FIGS. 6 and 7, a movable first portion 68 of the switch 33 is movable toward the circuit board 66 under force F applied to the lens 32 from a first position in which the switch 33 is open (shown in FIG. 6) to a second position (shown in FIG. 7) in which the first portion 68 of the switch 33 moves into contact with the circuit board 66 to thereby close the switch 33 and a circuit in the circuit board 66. When the switch 33 is closed in this manner, electrical current is provided in terminals 72 received in an electrical connector 74 and is provided to the latch assembly 22 via the wire harness 76 of FIG. 1 to unlatch the latch 82. Current to the bulb 38 is provided by a separate wiring harness (not shown) to terminals 37 of the socket 36. Current to the terminals 37 controls the on/off status of the bulb 38, and is provided according to the position of a separate switch located in the vehicle 10 that is used to set the on/off status of vehicle headlights as will be understood by those skilled in the art. In other words, the bulb 38 is on and provides illumination when the headlights are on.

Referring again to FIG. 1, the electrical connector 74 is electrically connected to the latch assembly 22 via a wire harness 76 and an electrical connector 78 of the latch assembly 22. The electrical connector 78 is electrically connected to a solenoid 80 housed within the latch housing 83. The solenoid 80 actuates a latch 82 when activated by electrical current to thereby move the latch 82 from a latched position in which the latch 82 extends through an opening in a striker 84 secured to the vehicle body 14, to an unlatched position in which the latch 82 moves out of the opening in the striker 84 to release the latch housing 83 and deck lid 12 from the vehicle body 14. Other latch assemblies may be used within the scope of the claimed invention.

The base portion 60 of the switch housing 34 supports a biasing element 88 on the underside of the base portion 60. Specifically, the switch housing 34 has rails 90 that form slots 92 that receive ends 94 of the biasing element 88. The biasing element 88 is biased to the uncompressed state shown in FIG. 3, but is compressible to a compressed position shown in FIG. 7. The biasing element 88 shown is a leaf spring. However, other types of springs or other biasing elements may be used within the scope of the claimed invention.

The switch 33 is moved to the second position to activate the latch assembly 22 and the biasing element 88 is moved to the compressed position by application of the force F on the lens 32. Specifically, the lens 32 is supported by the lamp housing 30 and is configured to be movable relative to the lamp housing 30 between the undepressed position of FIG. 6 and the depressed or actuated position of FIG. 7. The lens 32 is pivotably mounted to the lamp housing 30 such that the lens 32 pivots relative to the lamp housing 30 when the lens is moved from the undepressed position to the depressed position. As shown in FIG. 3, the lens 32 has a lens face 100 and spaced support walls 102 extending generally parallel with one another from the lens face 100. Each support wall 102 has a generally cylindrical protrusion 104 extending outward from the support wall 102.

An actuator plate 110 is configured with side recesses 112 and is sized so that the plate can rest on the support walls 102 with upper edges of the support walls 102 positioned in the recesses 112. Only one of the side recesses 112 is visible in FIG. 3. The opposing side of the actuator plate 110 has an identical side recess 112. When arranged in this manner, the actuator plate 110 is supported on and partially captured between the support walls 102.

The lens 32 is pivotably supported by the lamp housing 30 by placing the support walls 102 just inward of the sidewalls 48B of the lamp housing, and flexing the support walls 102 slightly inward to allow the protrusions 104 to fit through the openings 42A, 42B. The end wall 40A is also slipped over angled ends 106 of the support walls 102 to fit against the edge of the support walls 102 in crevices 108. The lens 32 is shown assembled to the lamp housing 30 in this manner in FIG. 4. The socket 36 holding the bulb 38 is supported on the support walls 102 by sliding the socket downward over the edges of the support walls 102 to capture the support walls 102 in grooves 114 formed by flanges 116 of the socket 36. The grooves 114 and the flange 116 are best shown in FIG. 3. The bulb 38 is thus supported by the lamp housing 30 via the socket and extends in the open space between the support walls 102 so that the bulb 38 is positioned adjacent to the lens 32, just above the lens 32 and not in contact with the lens 32.

The switch housing 34 is supported on the lamp housing 30 by slightly flexing the sidewalls 62A, 62B of the switch housing 34 outward and sliding the sidewalls 62A over the sidewalls 48B of the lamp housing 30 until the protrusions 44 are captured in the slots 64. In this arrangement, the switch 33 and the biasing element 88 are positioned just above the actuator plate 110.

Figure 6:
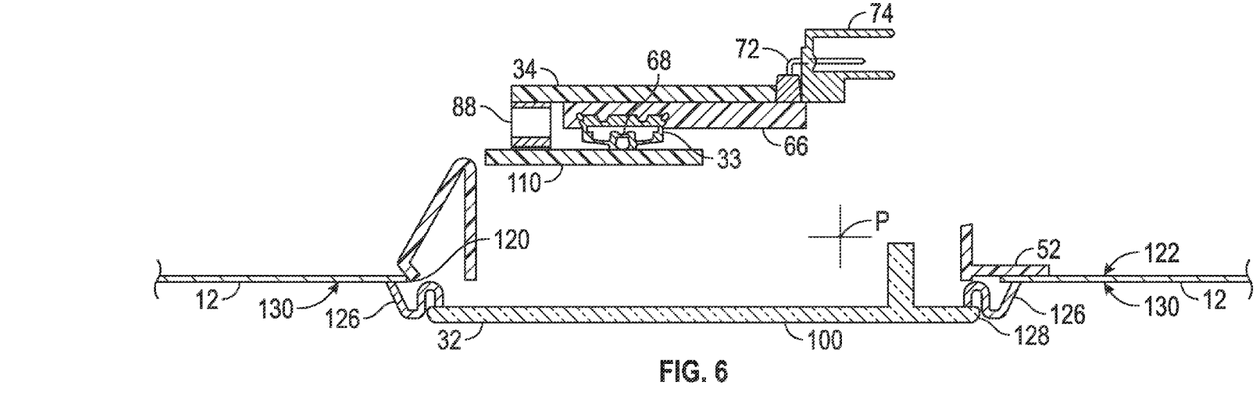
FIG. 6 is a schematic illustration in cross-sectional view of the lamp assembly of FIGS. 1-5 taken at line 6-6 in FIG. 5 with the lens in an undepressed position and the switch in a first position.
Figure 7:
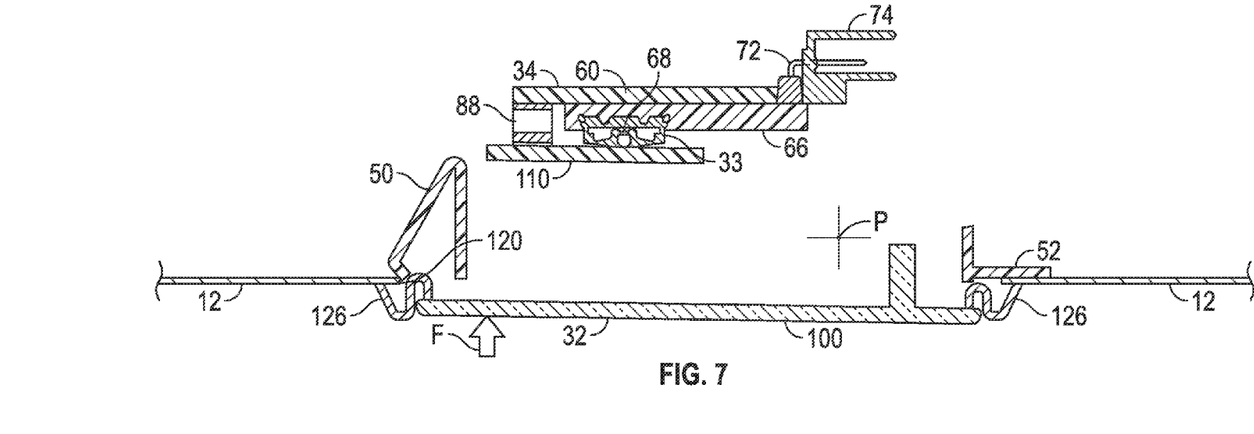
FIG. 7 is a schematic illustration in cross-sectional view of the lamp assembly of FIGS. 1-6 taken at line 7-7 in FIG. 5 with the lens in a depressed position and the switch in a second position.

Referring to FIGS. 1, and 6-7, the deck lid 12 has an opening 120 that permits the lamp assembly 28 to be supported at and partially extend through the deck lid 12. The lamp assembly 28 can be inserted partially through the opening 120 from below in FIGS. 1, 6, and 7, by tilting the lamp assembly 28 so that the support arms 52 pass to the upper side of the deck lid 12 and rest on an upper surface 122 of the deck lid 12. The opposite end of the lamp assembly 28 can then be pushed upward through the opening 120 so that the tab 50 flexes, compresses inward, and is biased against the edge of deck lid 12 at the other end of the opening 120.

Figure 5:
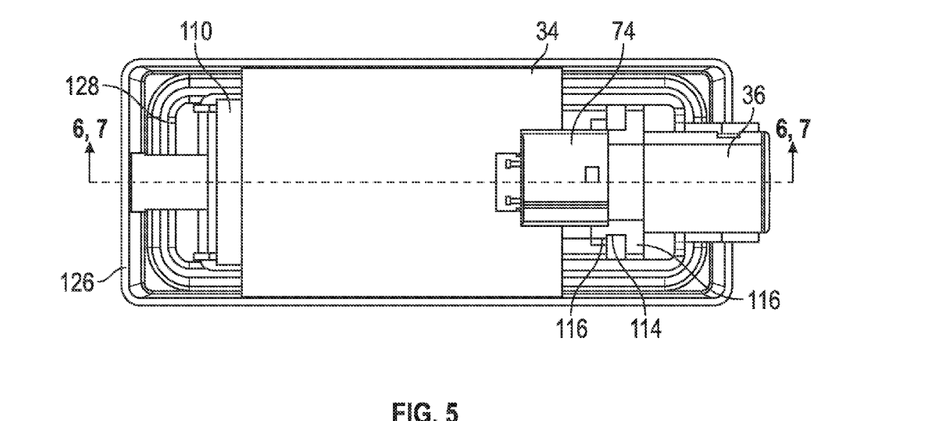
FIG. 5 is a schematic illustration in plan view of the lamp assembly of FIGS. 1-4.

When the lamp assembly 28 is attached to and supported on the deck lid 12 as described, the lens 32 will remain on an opposite side of the opening 120 than the remainder of the lamp assembly 28 so that the lens 32 is exposed at and covers the opening 120. The lens 32 has a lens face 100 at a central portion of the lens 32 with a flexible rim 126 that can be co-molded with the lens face 100, and extends around the perimeter 128 of the lens face 100 as best shown in FIG. 5. When the support arms 52 are inserted through the opening 120, the rim 126, which is wider than the opening 120, will flex into position against an exterior surface 130 of the deck lid 12, with the deck lid 12 trapped between the support arms 52 and the rim 126 as shown in FIG. 6. The rim 126 will similarly rest against the outer surface 130 of the deck lid 12 adjacent to the tab 50. FIG. 5 illustrates that the rim 126 is the widest portion of the lamp assembly 28, which allows the remainder of the lamp assembly 28 to pass through the opening 120 while the lens face 100 and rim 126 remain at the exterior of the vehicle 10. Because the rim 126 is flexible and compliant, the rim 126 also serves as a seal around the opening 120.

The lamp assembly 29 of FIG. 1 is mounted to the deck lid 12 at an additional opening 132 in a similar manner. The lamp assembly 29 may have all of the same components as the lamp assembly 28, except need not have the switch housing 30, the switch 33, or the circuit board 66. The lens of the lamp assembly 29 need not be flexible, although the same lens 32 may be used in the lamp assembly 29 if desired.

The lens 32 is configured to cause the switch 33 to move to the second position (also referred to as the actuated position) of FIG. 7 when the lens 32 is moved to the depressed position by application of force F on the lens face 100. The force F may be a manual force, and is applied to the lens face 100, which functions as a touch pad in addition to permitting light from the bulb 38 to pass through to illuminate the license plate 24 of FIG. 1. The flexible lens 32 will flex in reaction to the force F, moving from the unflexed position of FIG. 6 to the flexed position of FIG. 7, and thereby allowing the lens face 100 to move inward toward the switch 33. Movement of the lens 32 in response to the force F is a pivoting movement about a pivot axis P that extends through the center of the protrusions 104, as indicated in FIG. 3 and also shown in FIG. 7. Under a force F of a sufficient predetermined magnitude, the lens 32 will thus rotate slightly in a clockwise direction in FIG. 7 about pivot axis P, with at least the portion of the rim 126 adjacent the tab 50 flexing. The flexing of the rim 126 permits the lens face 100 to move relative to the flexible rim 126 toward the switch 33 from the undepressed position to the depressed position. The actuator plate 110 is rigidly connected to the lens 32 such that the actuator plate 110 moves in unison with the lens 32. The lens 32 can pivot relative to the lamp housing 30 and the switch housing 34 mounted thereon because the support arms 52 and tab 50 hold the lamp housing 30 securely against the deck lid 12. The base 60, circuit board 66, and switch 33 are thus also held stationary relative to the deck lid 12 without pivoting when the lens 32 is pivoted.

When the lens 32 is pivoted by the force F, the actuator plate 110 is configured to contact the switch 33, thereby causing the switch 33 to move from the first position of FIG. 6 to the second position of FIG. 7. At the same time, the actuator plate 110 is configured to also contact the biasing element 88. The biasing element 88 compresses, and a resulting spring force urges the actuator plate 110 and thereby the lens 32 toward the undepressed position. Thus, when the force F is removed, the biasing element 88 will return to its uncompressed state, acting on the actuator plate 110 to move the lens 32 back to the undepressed position.

Figure 8:
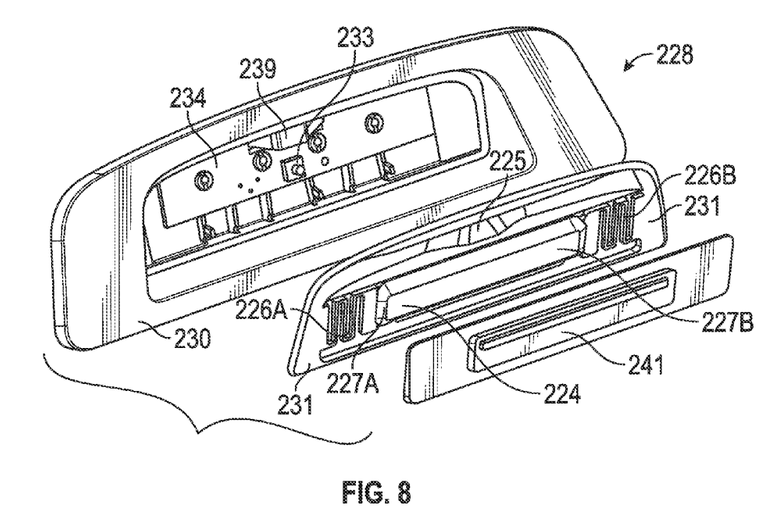
FIG. 8 is a schematic illustration in exploded view of a lamp assembly in accordance with an alternative aspect of the present teachings.

FIG. 8 shows an alternative embodiment of a lamp assembly 228 for use in place of lamp assembly 28 in the vehicle 10 of FIG. 1 to illuminate the license plate 24 and the exterior portion 26 of the vehicle. The lamp assembly 228 has a flexible lens 232 that functions as a touch pad to activate a switch 233 that causes the latch assembly 22 of FIG. 1 to unlatch. The switch 233 is supported by the lamp housing 228 and is movable between a first position shown in FIG. 11 and a second position 233A shown in FIG. 12. An internal support 234 within the lamp housing 230 serves as a switch housing 234. The switch housing 234 supports a circuit board 266. Electrical terminals 272 transfer current from the circuit module to an electrical connector 274 mounted on the lamp housing 230. The electrical connector 274 connects to the wire harness 76 of FIG. 1 to connect the lamp assembly 228 with the latch assembly 22. When the lamp assembly 228 is installed on the vehicle 10, the switch 233 is thus operatively connected to the latch assembly 22 and operable to unlatch the latch assembly 22 when the switch 233 is in the second position 233A.

Figure 11:
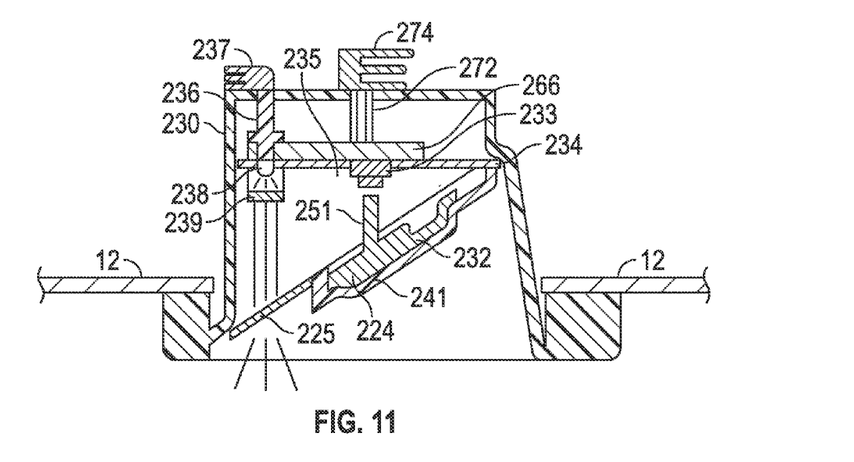
FIG. 11 is a schematic illustration in cross-sectional view of the lamp assembly of FIGS. 8-10 taken at line 11-11 in FIG. 9 and rotated 90 degrees counterclockwise and with the lens in an undepressed position.

The switch housing 234 also supports a socket 236 that holds a bulb 238. The lens 232 is supported by the lamp housing 230 as shown in FIG. 11. The lens 232 may be secured to the lamp housing 230 by adhesive, snap tabs, set screws, or any other suitable manner. An internal cavity 235 is formed between the lens 232 and the switch housing 234. The lens 232 may be referred to as an outer lens, as an inner lens 239 is supported on the switch housing 234 and is positioned in the cavity 235 to more immediately surround the bulb 238. Light from the bulb 238 thus passes through both the inner lens 239 and the outer lens 232 in order to illuminate the exterior of the vehicle 26 and the license plate 24 of FIG. 1. Electrical power is provided to the bulb 238 by a separate wiring harness (not shown) to terminals 237 of the socket 236. Electrical power to the terminals 237 thus controls the on/off status of the bulb 238, and is provided according to the position of a separate switch located in the vehicle 10 that is used to set the on/off status of vehicle headlights as will be understood by those skilled in the art. In other words, the bulb 238 is on and provides illumination when the headlights are on.

Figure 10:
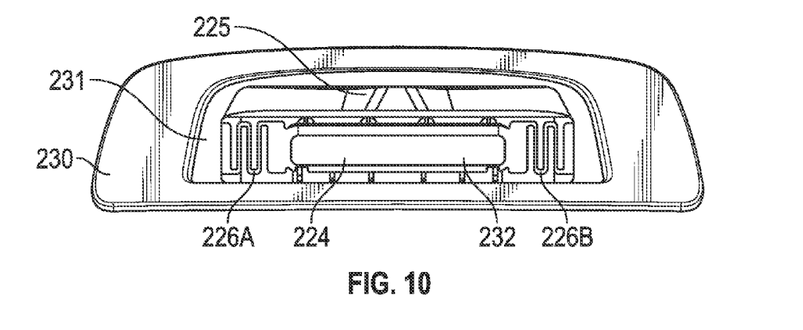
FIG. 10 is a schematic illustration in front view of the lamp assembly of FIGS. 8-9 with a cover removed from a lens.
Figure 12:
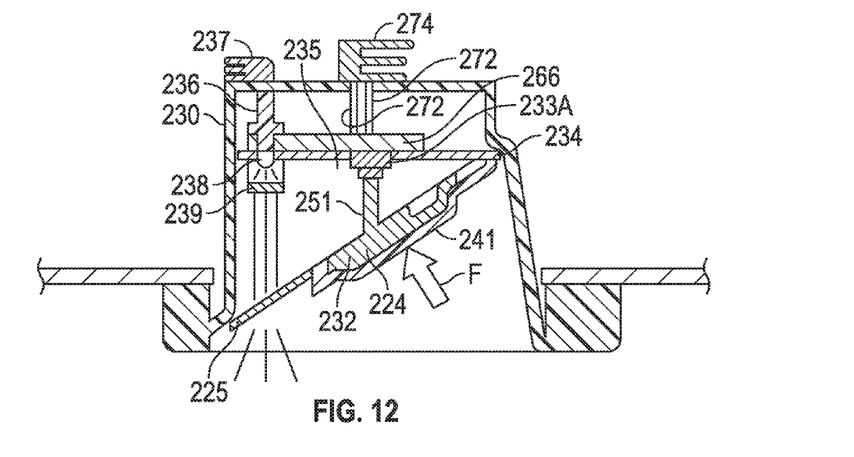
FIG. 12 is a schematic illustration in cross-sectional view of the lamp assembly of FIGS. 8-10 taken at line 12-12 in FIG. 9 and rotated 90 degrees counterclockwise and with the lens in a depressed position.

As best shown in FIGS. 8 and 10, the lens 232 is configured to be movable relative to the lamp housing 230 between an undepressed position shown in FIG. 11 and a depressed position shown in FIG. 12. The lens 232 is configured to cause the switch 233 to move to the second position 233A when the lens 232 is moved to the depressed position.

Figure 9:
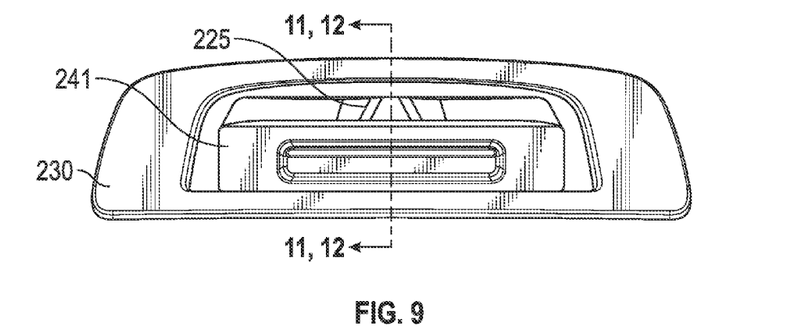
FIG. 9 is a schematic illustration in front view of the lamp assembly of FIG. 8 when assembled.

The lens 232 has flexible portions 226A, 226B, and a lens face 224 connected to the flexible portions 226A, 226B. The flexible portions 226A, 226B in the embodiment shown are first and second flexible arms that are integral with and extend from the lens face 224. The first flexible arm 226A extends from a first portion 227A of the lens face 224 at one end of the lens face 224. The second flexible arm 226B extends from a second portion 227B of the lens face 224 at an opposing end of the lens face 224. Both of the flexible arms 226A, 226B extend between the lens face 224 and a base portion 231 of the lens 232. The base portion 231 circumscribes the lens face 224 and the flexible arms 226A, 226B and is secured to the lamp housing 230 as described herein. The lens 232 also has a portion 225 generally centered in the base portion 231 and configured to align with the inner lens 239 to promote light transfer. An optional flexible cover 241 can be configured to mount to and generally cover the lens face 224 and the flexible arms 226A, 226B as indicated in FIG. 9. The flexible cover 241 is of a resilient, flexible material that flexes in unison with the flexible arms 226A, 226B when a force is applied. When the cover 241 is used, the force F is applied to the outer surface of the cover 241 and acts through the cover 241 on the lens face 224.

Figure 13:
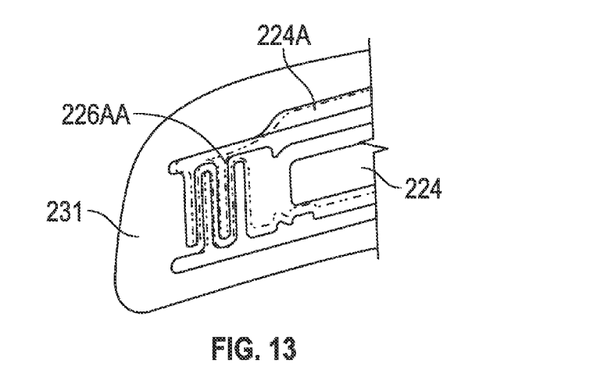
FIG. 13 is a schematic illustration in fragmentary perspective view of a portion of the lens of FIGS. 8-12, showing in phantom a flexible arm of the lens flexing when a lens face is depressed.

The flexible arms 226A, 226B are biased to the unstressed state shown in FIGS. 8 and 10 which is achieved in the absence of force depressing the lens face 224 and cover 241. When an inward force F is applied to the cover 241, as indicated in FIG. 12, the lens face 224 between the flexible arms 226A, 226B will be permitted to move relative to the lamp housing 230 in the direction of the force F to the depressed position shown due to the ability of the arms 226A, 226B to flex. FIG. 13 shows a portion of the lens face 224 moved to the depressed position 224A shown in phantom, and the arm 226A flexing to the stressed state 226AA. The arms 226A, 226B have a serpentine shape, and straighten slightly as the lens face 224 moves inward. The arms 226A, 226B, however, are biased to the unstressed state shown in FIG. 8. Accordingly, when the force F is removed, the lens face 224 will move back to the undepressed position of FIG. 11, out of contact with the switch 233 when the flexible arms 226A, 226B return to their unstressed state.

As best shown in FIGS. 11 and 12, the lens face 224 has an extension 251 extending from an inner side and generally aligned with the switch 233. When the force F is applied to the cover 241 and thereby to the lens face 224 (or directly to the lens face 224 if no cover 241 is used), the lens face 224 moves to the depressed position 224A shown in FIG. 12, and the extension 251 moves with the lens face 224 to contact the switch 233, moving the switch 233 from the first position shown in FIG. 11 to the second position shown in FIG. 12. In the second, depressed position, the switch 233 moves into contact with the circuit board 266 to thereby close a circuit in the circuit board 266. When the switch 233 is closed in this manner, electrical current is provided in the terminals 272 received in the electrical connector 274, and then through the wire harness 76 of FIG. 1 to the latch assembly 22 to unlatch the latch 82.

Those having ordinary skill in the art will recognize that terms such as "above," "below," "upward," "downward," "top," "bottom," etc., are used descriptively for the figures, and do not represent limitations on the scope of the invention, as defined by the claims.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A lamp assembly for illuminating an exterior portion of a vehicle, the lamp assembly comprising:
   a lamp housing;
   a switch supported by the lamp housing and movable between a first position and a second position;
   a flexible lens supported by the lamp housing and configured to flex in response to an applied force to thereby move relative to the lamp housing between an undepressed position and a depressed position; wherein the lens is configured to cause the switch to move to the second position when the lens is moved to the depressed position;
   wherein the lens has a lens face and a flexible rim surrounding a perimeter of the lens face; and wherein the flexible rim flexes to permit the lens face to move relative to the flexible rim toward the switch when the lens moves from the undepressed position to the depressed position.

2. The lamp assembly of claim 1, further comprising:
   a biasing element configured to bias the lens to the undepressed position.

3. The lamp assembly of claim 2, wherein the lens is an outer lens; and further comprising:
   an inner lens supported by the lamp housing and positioned in a cavity defined between the lamp housing and the outer lens; and
   a bulb operatively supported by the lamp housing and positioned between the lamp housing and the inner lens.

4. The lamp assembly of claim 2, further comprising:
   a switch housing attached to the lamp housing; wherein the switch and the biasing element are operatively mounted to the switch housing.

5. The lamp assembly of claim 4, wherein the lens has spaced support walls extending from the lens face; wherein the switch housing is configured to attach to the spaced support walls; and further comprising:

a socket carrying a bulb and supported by the spaced support walls such that the bulb is adjacent the lens face.

6. The lamp assembly of claim 4, wherein the lens is pivotably mounted to the lamp housing such that the lens pivots relative to the lamp housing when the lens is moved from the undepressed position to the depressed position.

7. The lamp assembly of claim 6, further comprising:
an actuator plate connected to the lens such that the actuator plate moves with the lens;
wherein the actuator plate is configured to contact the switch when the lens moves from the undepressed position to the depressed position to thereby cause the switch to move from the first position to the second position; and
wherein the actuator plate is configured to contact the biasing element when the lens moves from the undepressed position to the depressed position, the lens thereby being biased to the undepressed position.

8. A lamp assembly for illuminating a license plate on an exterior portion of a vehicle, the lamp assembly comprising:
a lamp housing;
a switch supported by the lamp housing and movable between a first position and a second position;
a lens supported by the lamp housing; wherein the lens has a flexible portion and a lens face connected to the flexible portion; wherein the flexible portion flexes relative to the lens face to permit the lens face to move relative to the lamp housing between an undepressed position and a depressed position in response to an applied force on the lens face;
wherein the lens face is configured to cause the switch to move to the second position when the lens face is moved to the depressed position;
wherein the lens has a base portion fixed relative to the lamp housing; and wherein the flexible portion includes a flexible arm integrally connected to and extending between the base portion and the lens face to permit the lens face to move relative to the base portion.

9. The lamp assembly of claim 8, wherein the flexible arm is a first flexible arm extending from a first portion of the lens face; and further comprising:
a second flexible arm integral with and extending from a second portion of the lens face.

10. The lamp assembly of claim 8, wherein the flexible portion is biased to an unflexed state to thereby bias the lens face to the undepressed position.

11. A vehicle comprising:
a vehicle body defining an access opening;
a closure panel operatively connected to the vehicle body and configured to be selectively movable between a closed position in which the closure panel closes the access opening, and an open position in which the closure panel permits access through the access opening;
a latch assembly selectively latching the closure panel to the vehicle body when the closure panel is in the closed position, and selectively unlatchable to permit movement of the closure panel to the open position;
a lamp assembly mounted to the closure panel and configured to illuminate an exterior portion of the closure panel; wherein the lamp assembly includes:
a lamp housing;
a switch supported by the lamp housing and movable between a first position and a second position; wherein the switch is operatively connected to the latch assembly and operable to unlatch the latch assembly when the switch is in the second position;
a flexible lens supported by the lamp housing and configured to flex to thereby move relative to the lamp housing between an undepressed position and a depressed position; wherein the lens is configured to cause the switch to move to the second position when the lens is moved to the depressed position; and
wherein the lens has a lens face and a flexible portion connected to a perimeter of the lens face; wherein the flexible portion flexes relative to the lens face to permit the lens face to move relative to the lamp housing between the undepressed position and the depressed position in response to an applied force on the lens face.

12. The vehicle of claim 11, further comprising:
a biasing element configured to bias the lens to the undepressed position.

13. The vehicle of claim 12, further comprising:
a switch housing attached to the lamp housing; wherein the switch and the biasing element are operatively mounted to the switch housing;
wherein the lens is pivotably mounted to the lamp housing such that the lens pivots relative to the lamp housing when the lens is moved from the undepressed position to the depressed position;
an actuator plate connected to the lens such that the actuator plate moves with the lens;
wherein the actuator plate is configured to contact the switch when the lens moves from the undepressed position to the depressed position to thereby cause the switch to move from the first position to the second position; and
wherein the actuator plate is configured to contact the biasing element when the lens moves from the undepressed position to the depressed position, the lens thereby being biased to the undepressed position.

14. The vehicle of claim 11, wherein the lens is an outer lens; wherein the flexible portion is a pair of flexible arms extending from opposite ends of the outer lens; and further comprising:
an inner lens supported by the lamp housing and positioned in a cavity defined between the lamp housing and the outer lens; and
a bulb operatively supported by the lamp housing and positioned between the lamp housing and the inner lens.

* * * * *